SYSTEMS FOR SELECTING AMONG A PLURALITY OF INCOMING SIGNALS THE SIGNAL OF EXTREME VALUE FALLING SHORT OF A LIMITING VALUE WITH MEANS FOR BLOCKING INCOMING SIGNALS BEYOND THAT LIMITING VALUE

Filed March 2, 1960 3 Sheets-Sheet 1

Inventor:
Alfred Brunner
BY
Pennie Edmonds Morton Barrows & Taylor
ATTORNEYS

SYSTEMS FOR SELECTING AMONG A PLURALITY OF INCOMING SIGNALS THE SIGNAL OF EXTREME VALUE FALLING SHORT OF A LIMITING VALUE WITH MEANS FOR BLOCKING INCOMING SIGNALS BEYOND THAT LIMITING VALUE

Filed March 2, 1960 3 Sheets-Sheet 2

*Inventor:*
Alfred Brunner
BY
Pennie Edmonds Morton Barrows & Taylor
ATTORNEYS

March 9, 1965 A. BRUNNER 3,173,127

SYSTEMS FOR SELECTING AMONG A PLURALITY OF INCOMING SIGNALS THE SIGNAL OF EXTREME VALUE FALLING SHORT OF A LIMITING VALUE WITH MEANS FOR BLOCKING INCOMING SIGNALS BEYOND THAT LIMITING VALUE

Filed March 2, 1960 3 Sheets-Sheet 3

Inventor:
Alfred Brunner
BY
Pennie Edmonds, Morton Barrows, Taylor
ATTORNEYS

United States Patent Office 3,173,127

Patented Mar. 9, 1965

3,173,127

SYSTEMS FOR SELECTING AMONG A PLURALITY OF INCOMING SIGNALS THE SIGNAL OF EXTREME VALUE FALLING SHORT OF A LIMITING VALUE WITH MEANS FOR BLOCKING INCOMING SIGNALS BEYOND THAT LIMITING VALUE

Alfred Brunner, Winterthur, Switzerland, assignor to Sulzer Freres, Societe Anonyme, Winterthur, Switzerland Filed Mar. 2, 1960, Ser. No. 12,430

Claims priority, application Switzerland, Mar. 5, 1959, 70,408

6 Claims. (Cl. 340—147)

Figure 1:
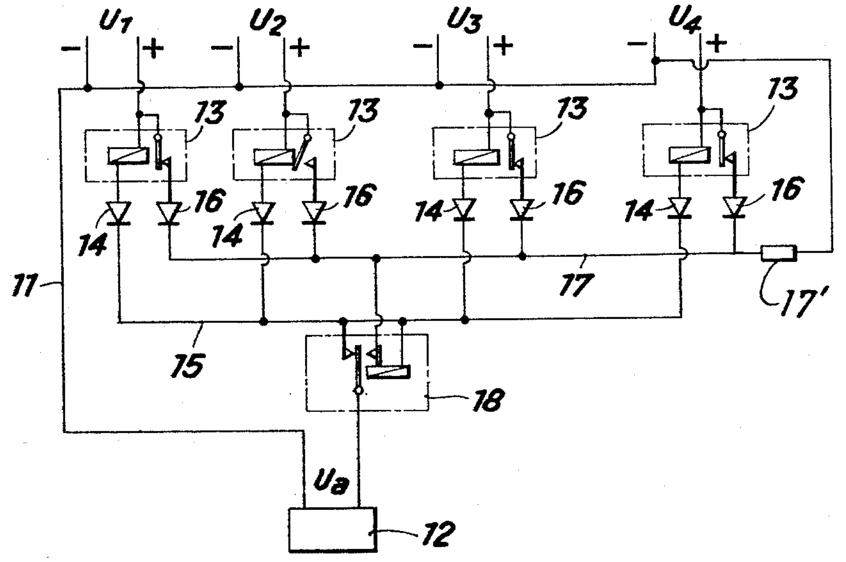

This invention relates to a pulse transmission system and more particularly to a pulse transmission system which has a blocking device which releases, from among a plurality of incoming pulses, only that signal representing an extreme value for transmission to an associated signal receiver.

Systems of the type described have for example been proposed for regulating devices of steam generators. In such an embodiment, temperature signal generators are assigned to a plurality of parallel tubes through which the working medium flows, with these generators actuating, through a blocking device, means for varying the rate of flow of the working medium, and with the blocking device permitting signal transmission only from the pulse generator instantaneously responsive to the highest temperature.

In general, signal transmission systems of the type described above may be used in regulating and control systems designed to regulate a plurality of process variables of a plant. In plants where more than one localized spot is exposed to damage due to excessive stresses, this permits utilization of the signal originating from the point endangered most—in other words, the one having an extreme value—as a control point for limitation or regulation rather than of an individual signal which in each case merely represents the conditions prevailing at one and the same spot.

In the case of steam generators, the signals involved may be for example temperature signals. The object in this instance is to make the heating surfaces serving for evaporation and superheating as small as possible and at the same time to achieve maximum efficiency. To this end the maximum operating temperature is selected as close as possible to the temperature limit permissible for the material comprising the various parts of the steam generator. But since transient and even long-time hot spots may develop due to factors that are not readily controlled, such as breakdown of individual burners, slagging of tubes, and so forth, provision must be made for a corrective action for regulation or limitation of the various thermal stresses, not by an average temperature, but by a peak spot temperature.

There may be a very large number of points of measurement in such a system which produce signals corresponding to measured process variables. In a steam generator, for example, as many as one hundred, and sometimes even more, spot-temperature-sensing elements may be associated with the tubes of a superheater surface. These may be constructed as resistance thermometers or thermocouples, for example, which produce electric signals that correspond to the local temperature and are passed to the blocking device. The latter then selects from all incoming signals the extreme signal representing the highest temperature and feeds it alone to the associated pulse receiver. While such temperature-sensitive elements and the electrical system components to which they are connected—such as lines, amplifiers, relays, etc.—today have a long service life, failures and defects cannot be avoided in the long run. It is apparent that the probability of such trouble developing within a given period of time increases with the number of signal generators employed. If a plurality of signal generators is in use, trouble is likely to develop at relatively short time intervals.

If, for example, the slidewire of a resistance thermometer breaks, the electrical resistance of the measuring means becomes infinitely great. The resistance thermometer in question will then produce a temperature signal indicative of a nonexistent peak temperature. If this temperature signal is transmitted through the blocking device to the signal receiver—for example, to means for varying the firing rate—then the result will be a corrective action having the effect of reducing the firing rate which will not at all be representative of the instantaneous operating condition of the steam generator. Operation then is far from regulated.

A similar situation may prevail in pressure-regulated plants—for example, in chemical process plants—or in the case of fuel-element temperature control in nuclear reactors.

The invention makes it possible to overcome in large measure the drawbacks outlined. The signal-transmission system of the invention is characterized by an additional blocking device which blocks transmission of the instantaneous extreme signal and in its place releases a second pulse next in magnitude to the extreme pulse for transmission to the signal receiver so long as the extreme signal and/or a value associated with it are above a predetermined point.

In order to fully appreciate the invention, reference is again made to a plant such as a steam generator in which a plurality of temperature signal generators are assigned to the parallel-connected tubes of a heating surface. Assume that a single temperature signal generator produces a temperature signal that rises either slowly and steadily or rises suddenly and that is larger than the signals from the other pulse generators. By means of the blocking device described at the outset, this extreme signal is made to set up, particularly when the temperature rises to or above a certain level, a counterresponse to the temperature rise. This may, for example, be the opening of an injection valve located in the line through which the working medium is supplied to the heating surface, so that cooler working medium is sprayed into the line and the temperature in all tubes of the heating surface is lowered or, in the tube involved, is adjusted to the preset desired value, for example, 650° C.

If the signal generator involved does not respond to these control actions but produces temperature signals that continue to rise steadily, then the cause can only be a failure or defect in the signal generator or a failure in components of the signal-transmission system. If this extreme pulse were to continue to be the control point for actuation of the injection valve, serious operating troubles would result. Such troubles are prevented by the additional blocking device of the invention. As soon as, and so long as, the extreme signal overshoots a predetermined set point— 800° C., for instance—its transmission is blocked by the secondary blocking device, and a second signal next in magnitude to the extreme signal and produced by another pulse generator is released for transmission to the pulse receiver. This second temperature signal reflects a perfectly normal operating temperature. By transferring control to the second signal undisturbed, regulated continuation of operation of the steam generator is assured.

The predetermined set point is preferably selected at a fixed value. In some cases, however, means may be readily available for establishing the set point as a function of the second signal—for example, as a function of the difference between the extreme signal and second signal. Also, means might be provided for selecting the set point as a function of an average value of at least some of the signals.

It also proves of advantage to have the additional blocking device release for transmission to the signal receiver the signal which at a given instant is next in magnitude to the extreme signal as soon as the rate of change of the extreme signal exceeds a given maximum. Such an arrangement makes it possible to correct the mentioned troubles promptly after they develop.

It is not very likely that two signals will overshoot the set point at the same time—in other words, that trouble will develop simultaneously but independently at two different points in the signal generators or in the transmitting means. Nevertheless, it may be advisable in some cases to design the additional blocking device so that it will block transmission of all signals overshooting the set point but will permit transmission to the signal receiver of the one signal among the remaining signals that is next in magnitude to the predetermined set point.

Until the predetermined set point is reached, the extreme value is the control point in the system that is to be regulated or controlled. When the instantaneous extreme signal overshoots the set point, control passes to the signal next to it in magnitude. In accordance with another feature of the invention, damping means be provided which affect the blocking of the extreme signal and transmission of the second signal so as to effect a smooth transitition of the transmitted signal to the value of the second signal.

The invention and other features related to it are described below in detail in terms of the embodiments shown in the drawing, where—

Figure 2:
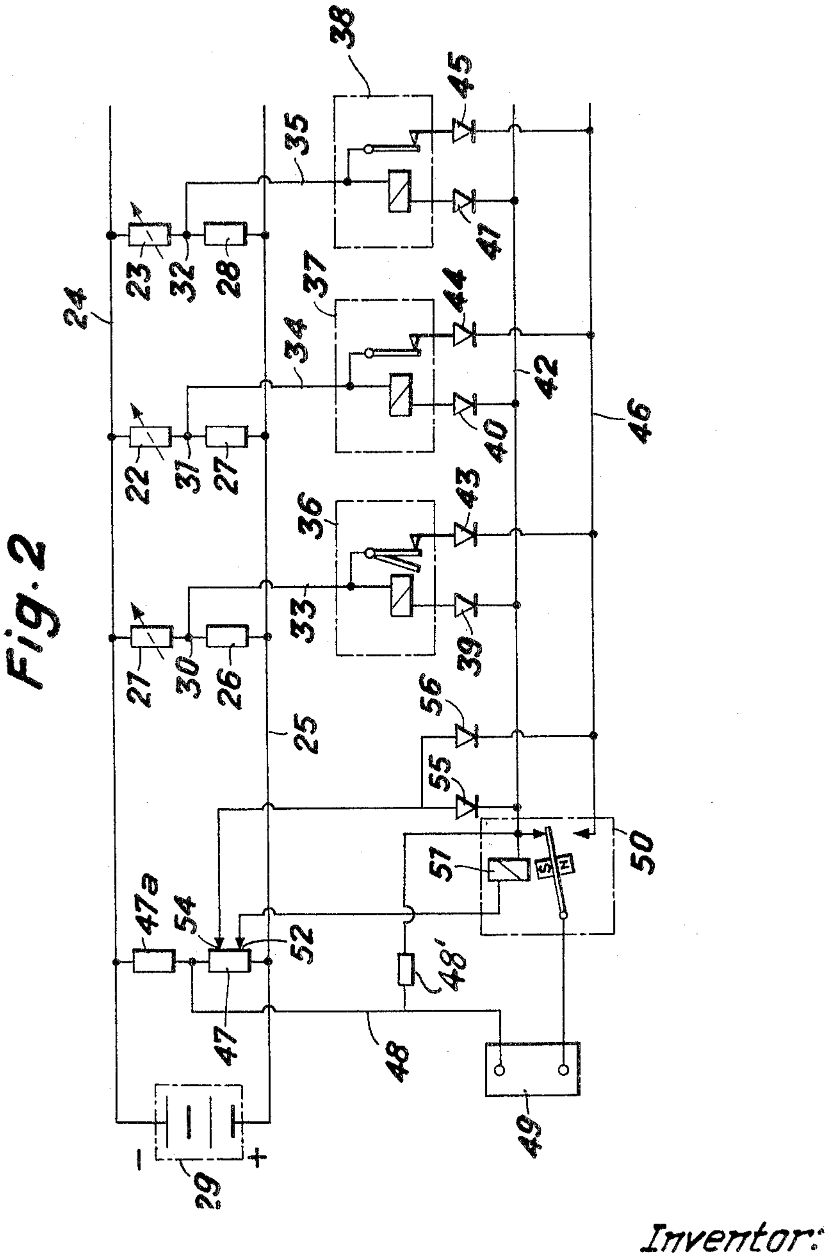
Figure 3:
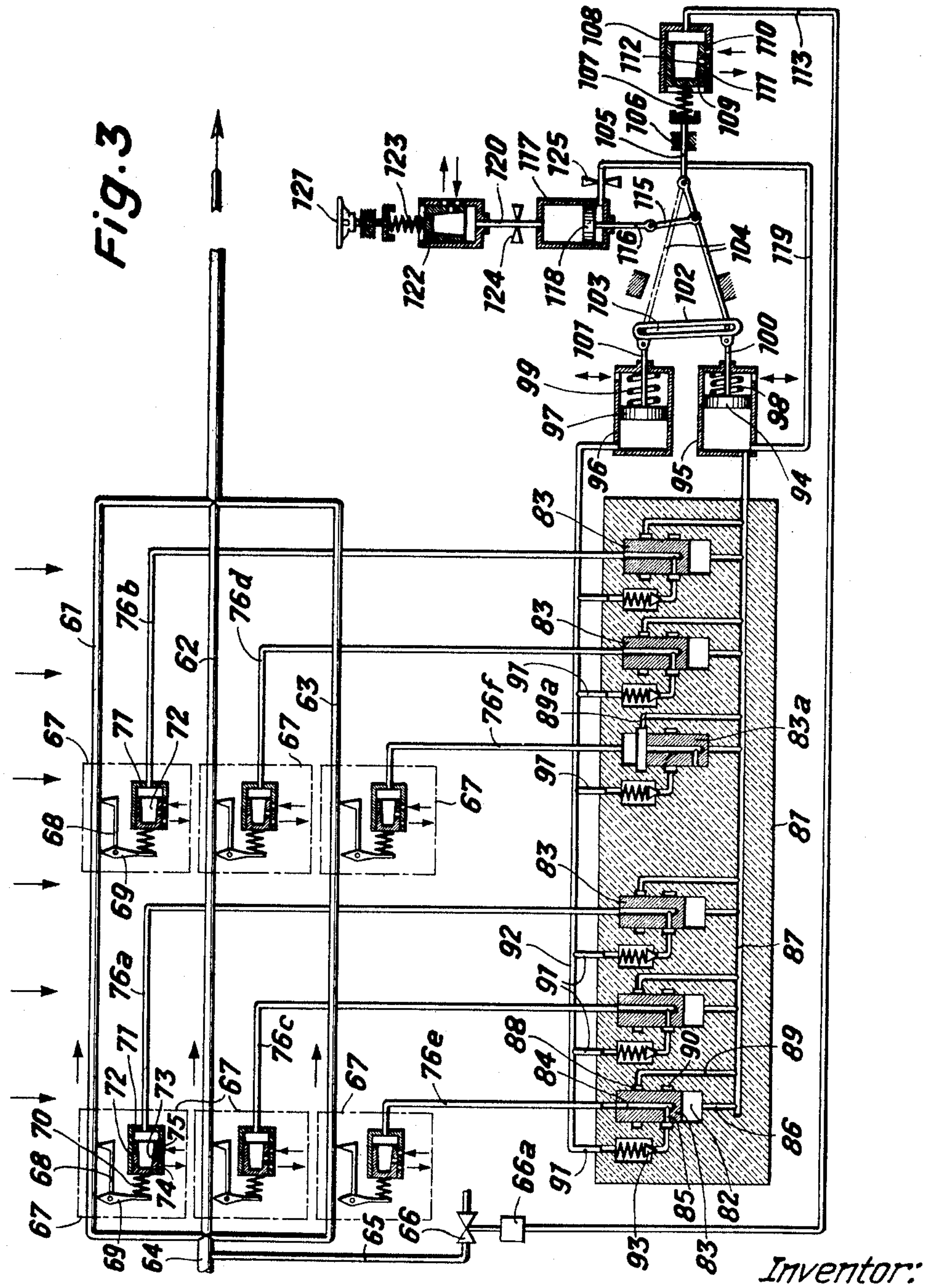

FIG. 1 represents an electric transmission system for signals in the form of electric potentials in which transmission of the second signal and blocking of the extreme signal take place as a function of the difference between the two signals;

FIG. 2 represents another electric signal-transmission system in which the blocking of the extreme signal and transmission of the second signal occur after a variable set point has been overshot by the extreme signal; and FIG. 3 represents a transmission system for hydraulic pressure signals, with the signals representing spot temperatures on parallel tubes of a heating surface of a steam generator.

The signal-transmission system of FIG. 1 has four signal inputs for signals in the form of direct-current voltages $U_1$, $U_2$, $U_3$, and $U_4$. These signals may for example represent spot temperatures on a heat-exchange surface. The negative terminals of the individual signal inputs are connected to a bus 11 which runs to a signal receiver 12, constructed as a load, which in turn is connected to an output $U_a$. Signal receiver 12 may for example be constructed as an electric actuator of a regulating means.

The positive terminals of each of the signal inputs are connected through the coil of a relay 13 and through a diode 14 to a bus 15. Since current can flow through diodes 14 in one direction only, bus 15 is always at the highest of the four potentials $U_1$ to $U_4$. Each of the positive terminals of the signal inputs is further connected, through the armature of its associated relay 13, and through a diode 16, to a second bus 17.

Between busses 15 and 17 and the load 12, there is interposed another relay, 18, whose armature will connect, depending on its position, either bus 17 or bus 15 to pulse receiver 12. Relay 18 is set up so that at a certain potential difference between bus 15, which is at all times at the highest potential, and bus 17 the relay coil pulls the armature from the position in which it is shown toward the right.

The principle of operation of the arrangement described is as follows: Assume that the signal input with the potential $U_2$ has the highest potential. The relays 13 in conjunction with the succeeding diodes 14 act as a blocking device in that of the four signals $U_1$ to $U_4$ those relays will pass to the signal receiver only the signal which in the case shown has the extreme value $U_2$. However, a current flowing through the coil of the relay involved causes its armature to be pulled up, thus opening the circuit between the positive terminal of pulse input $U_2$ and bus 17. This current is returned to the negative bus 11 through a resistor 17'. The latter therefore is given the potential corresponding to the second highest voltage of inputs $U_1$ to $U_4$.

When the potential difference between busses 15 and 17 overshoots a set point, the armature of relay 18 is pulled up by its coil. That relay therefore acts as a secondary blocking device in that it bars transmission of extreme pulse $U_2$ and in its place passes to the receiver the pulse which at that instant is next in magnitude. The potential difference controlling the changeover to the second-highest pulse is best set so that the extreme pulse is blocked only if its rise above the potentials of the other pulses is unmistakably the consequence of a defect in the signal generator or in accessory parts (not shown) of its transmission system, such as amplifiers, etc.

Diodes 14 and 16 may advantageously be constructed as semiconductor diodes. Moreover, the armature of relay 18 may advantageously be made to control an indicating or alarm device that calls attention to the trouble.

In the embodiment of FIG. 2, three temperature-signal generators constructed as resistance thermometers 21, 22 and 23 are utilized. These are connected at one end to line 24 and at the other end to line 25 through reference resistances 26, 27 and 28. Lines 24 and 25 are connected to the negative and positive terminal, respectively, of a source of direct-current voltage. Connected at 30, 31 and 32 are lines 33, 34 and 35, respectively, which are connected to relays 36, 37 and 38 and, depending on the position of the armatures of those relays, either with bus 42 through diodes 39, 40 and 41 or with bus 46 through diodes 43, 44 and 45.

Two identical resistances 47 and **47*a* are series-connected between lines 24 and 25. Connected between them is line 48, leading to signal receiver 49 that is constructed as a load. The other terminal of the pulse receiver is connected to the armature of a polarized relay 50, whose coil 51 is connected at one end to tap 52 of resistor 47 and at the other end to bus 42**.

The principle of operation of the arrangement described is as follows: The resistance thermometers are adjusted so that when the measured temperatures correspond to a desired value, lines 33, 34 and 35 are at the same potential as line 48. Now if the temperature of thermometer 21 increases, so will its resistance, and with it the potential of line 33. Relays 36 to 38 in conjunction with diodes 40 to 45 operate as a primary blocking device, as in the case of the embodiment according to FIG. 1, in that bus 42 is at all times at the potential corresponding to the highest temperature signal, and line 46 at the potential corresponding to the second-highest potential, as explained in connection with said embodiment.

So long as the potential of bus 42 is lower than that of tap 52, the armature of the polarized relay 50 will be in the position in which it is shown in the drawing, in which bus 42 is connected to signal receiver 49. Thus, the signal receiver receives the instantaneously highest temperature signal. Now if this extreme signal overshoots the point set on resistor 47 by positioning tap 52, current will flow in the opposite direction through the coil of polarized relay 50 which forms the secondary blocking device. This flow of current is permitted by a resistor 48'. As a result, the relay armature drops out and closes a circuit with bus 46. Transmission of the extreme pulse is thus blocked, and the next-lower pulse is passed to the pulse receiver.

By shifting tap 52 on resistor 47, the value of the set point which controls the changeover to the second-highest signal can be varied. There is a second tap, 54, on resistor 47 which is connected to busses 42 and 46, respectively, by way of diodes 55 and 56. The potential of tap 54 is higher than the potentials of lines 33 to 35 which correspond to the lowest desired value of the measured temperatures. The effect of this is that when the temperature drops, the signal transmitted to signal receiver 49 cannot drop below the value corresponding to that potential.

FIG. 3 shows diagrammatically a steam-generator heating surface formed of three parallel tubes 61, 62 and 63. The heat input is indicated by arrows. A line 65 with a control valve 66, through which cooler working medium—water, for example—may be injected into the incoming steam for regulation of the temperature, empties into feed line 64.

Two temperature signal generators 67 are assigned to each of tubes 61, 62 and 63. Variations in the length of the measuring section are transmitted by a measuring rod 68 through a lever 69 and a spring 70 to a piston 72, arranged in a cylinder 71. The wall of piston 72 presents a hole 73 which will coincide with a hole 74 or 75, respectively, in the cylinder wall when the piston is correspondingly displaced. Hole 75 is connected to a feed line (not shown), and hole 74 to a discharge line (not shown), for a hydraulic fluid-hydraulic oil, for example. A signal line is run from each temperature signal generator to the cylinder volume closed off by the piston (lines 76*a* to 76*f*). In each signal line, the hydraulic fluid has a pressure corresponding to the temperature measured.

A device 81 is provided which, from the various temperature signals existing at any time, isolates the extreme signal representing the highest temperature and the pulse signal then next to it in magnitude which represents the second-highest temperature. Device 81 has a cylinder space 82 for each temperature pulse generator in which a plunger 83 slides. Said plunger has a central bore 84 and an adjacent radial bore 85. The space above plunger 83 is connected to the associated pulse line 76 while the cylinder space below the plunger is connected to bus 87 through a hole 86. The wall of cylinder space 82 presents two annular recesses. Recess 88 is connected via line 89 to line 87, and recess 90 is connected, via line 91, to bus 92, in which a check valve 93 is located.

Bus 87 leads into the cylinder space of servomotor 95 that is closed off by piston 94, and bus 92 leads to the corresponding space of servomotor 96 with its piston 97. The pistons, loaded with springs 98 and 99, respectively, are coupled through bars 100 and 101 to rail 102. One end of a bar 104 is guided in a slot 103 in said rail in such a way that the end of the bar may be moved back and forth in the slot. Hinged to the other end of bar 104 is a bar 105 that is supported in a guide 106 and by means of a spring 107 connected with a piston 109 arranged in a cylinder 108. The wall of cylinder 108 presents holes 110 and 111 which can be made to coincide with hole 112 in piston 109 and through which hydraulic fluid can be introduced or discharged, respectively, through lines that are not shown. A pressure line 113 is connected to the pressure chamber closed off by piston 109. A pressure corresponding to the force of spring 107 is created in line 113 in the usual way. Line 113 is connected to the servomotor of injection valve 66, said servomotor constituting the receiver of signals from cylinder 108.

Bar 104 is coupled through bars 115 and 116 to a piston 118 that slides in a cylinder 117. The space below piston 118 is connected through a line 119 to the pressure chamber of cylinder 95. The pressure transmitted through line 120—set to the desired value by means of the force of a spring 123 which acts on a plunger 122 and is varied by means of a handwheel 121—acts upon the top of piston 118. Butterfly valves 124 and 125 are inserted in lines 120 and 119.

The principle of operation of the apparatus of FIG. 3 is as follows: The plunger 83 whose associated cylinder is connected to that one of lines 76*a* to 76*f* having the highest pressure is displaced into its lowermost position. This is the plunger which cooperates with the pulse generator 67 that represents the highest temperature. In the case of the embodiment shown, this is plunger 83*a*. With the plunger in the position shown, the pressure is transmitted via line 89*a* to bus 87. The other plungers are all in their uppermost position since the pressure acting upon their underside is higher than the pressure exerted on their top. In this position, pulse lines 76*a*, *b*, *c*, *d* and *e* are connected to the associated lines 91. The check valves 93 insure that the pressure existing in line 92 is at all times the second-highest of the pressures prevailing in signal lines 76*a* to 76*f*.

In the embodiment shown, it is the extreme signal corresponding to the highest temperature value that is released for transmission to signal receiver 66 and 66*a* through servomotor 94 and 95, bar 104, servo piston 109 and pressure line 113. However, if the pressure in line 87 rises to a level that does not correspond with normal conditions—due to a defect in any one of the signal transmission systems, for example—then the pressure which through line 119 acts upon the underside of piston 118 increases accordingly. If that pressure exceeds the pressure above piston 118, set by means of the handwheel and representing a limit value, then piston 118 moves upward and pulls bar 104 into the uppermost position, indicated by a dot-dashed line, in which the pressure in line 92 representing the next-lower temperature acts upon plunger 109 accordingly and thus is transmitted to pulse receiver 66*a* while transmission of the extreme signal is blocked altogether. Thus, parts 104 and 115 to 123 form the secondary blocking device within the meaning of this invention.

By providing butterfly valves 124 and 125, which operate as damping devices, the extreme signal is stopped and the second-highest pulse transmitted for smooth changeover of the transmitted pulse to the value of the second-highest pulse. In this way, jerky repositioning of injection valve 66 as command passes from one pulse to the other is avoided.

The invention is not confined to the embodiments shown in the drawing. Specifically, the blocking of transmission of the extreme pulse might be made a function, not of overshooting of the set point by the extreme pulse, but rather of overshooting of the set point by a quantity associated with the extreme pulse—for example, overshooting of a set point by the rate of change of the extreme pulse. Abnormal runaway of the extreme pulse due to a disturbance can then be detected promptly and utilized for blocking.

I claim:

1. A signal selection system comprising a plurality of incoming signal transmission lines connectable each to a separate source of signals, an outgoing signal transmission line, means selectively responsive to signals in all of said incoming lines to connect to said outgoing line the incoming line having a signal of extreme value, and means responsive to transgression of a limiting value by said last-named signal to conect to said outgoing line the incoming line whose signal is closest in value to said signal of extreme value.

2. A signal selection system comprising a plurality of incoming signal transmission lines connectable each to a separate source of signals, an outgoing signal transmission line, means selectively responsive to signals in all of said incoming lines to conect to said outgoing line the incoming line having a signal of extreme value, means responsive to transgression of a limiting value by said last-named signal to connect to said outgoing line the incoming line whose signal is closest in value to said signal of extreme value, and means to vary said limiting value as a function of the value of at least one of the signals in said incoming lines other than said signal of extreme value.

3. A signal selection system comprising a plurality of incoming signal transmission lines connectable each to a separate source of signals, first and second intermediate transmission lines, an outgoing transmission line, means responsive to signals on said incoming lines to connect to said first intermediate line the incoming line having a signal of extreme value and to connect to said second intermediate line the incoming line having a signal of value nearest said signal of extreme value, and means responsive to the value of the signal on said first intermediate line to connect said output line to said first intermediate line for values of said last-named signal short of a limiting value and to said second intermediate line for values of said last-named signal beyond said limiting value.

4. A signal selection system comprising a plurality of incoming signal transmission lines connectable each to a separate source of signals, first and second intermediate transmission lines, an outgoing transmission line, means responsive to signals in said incoming lines to connect to said first intermediate line the incoming line having a signal of maximum value and to connect to said second intermediate line the incoming line having a signal of value nearest said signal of maximum value, and means responsive to the value of the signal on said first intermediate line to connect said output line to said first intermediate line for values of said last-named signal above a limiting value and to said second intermediate line for values of said last-named signal below said limiting value.

5. A signal selection system comprising a plurality of incoming signal transmission lines connectable each to a separate source of signals, first and second intermediate transmission lines, an outgoing transmission line, means responsive to signals in said incoming lines to connect to said first intermediate line the incoming line having a signal of extreme value and to connect to said second intermediate line the incoming line having a signal of value nearest said signal of extreme value, and means responsive to the difference between the signals on said first and second intermediate lines to connect said output line to said first intermediate line for values of said difference below a specified amount and to said second intermediate line for values of said difference above a specified amount.

6. A signal selection system comprising a plurality of incoming signal transmission lines connectable each to a separate source of signals, first and second intermediate transmission lines, an outgoing transmission line, separate unidirectionally conducting devices connecting each of said incoming lines to said first intermediate line, separate unidirectionally conducting devices connecting each of said incoming lines to said second intermediate line, means responsive to conduction through any one of said first-named devices to disconnect the associated one of said incoming lines from said second intermediate line, and means responsive to the value of the signal on said first intermediate line to connect said output line to said first intermediate line for values of said last-named signal short of a limiting value and to said second intermediate line for values of said last-named signal beyond said limiting value.

References Cited in the file of this patent

UNITED STATES PATENTS

| | | |
|---|---|---|
| 1,585,729 | Matte | May 25, 1926 |
| 2,560,829 | Stewart | July 17, 1951 |
| 2,590,265 | Miner | Mar. 25, 1952 |
| 2,733,424 | Chen | Jan. 3, 1956 |
| 2,815,500 | Hance | Dec. 3, 1957 |
| 2,885,569 | Schuh | May 5, 1959 |
| 2,974,286 | Meyers | Mar. 7, 1961 |